United States Patent [19]

Stewart, Sr.

[11] 4,248,043

[45] Feb. 3, 1981

[54] APPARATUS FOR STORING ENERGY AND GENERATING ELECTRICITY

[76] Inventor: Donald E. Stewart, Sr., 768 N. First St., Hampton, Va. 23664

[21] Appl. No.: 946,567

[22] Filed: Sep. 28, 1978

[51] Int. Cl.³ ............................................. F16D 31/06
[52] U.S. Cl. ..................................... 60/325; 417/108; 290/54
[58] Field of Search ................ 60/325, 327, 398, 659; 417/108; 290/43, 54

[56] References Cited

U.S. PATENT DOCUMENTS

| | | | |
|---|---|---|---|
| 572,850 | 12/1896 | Young et al. | 417/108 |
| 1,034,703 | 8/1912 | Freeman | 417/108 |
| 3,601,979 | 8/1971 | Singer | 60/325 X |
| 4,135,364 | 1/1979 | Busick | 60/325 |

FOREIGN PATENT DOCUMENTS 2266003  10/1975  France ...................................... 60/398

Primary Examiner—Allen M. Ostrager
Assistant Examiner—Stephen F. Husar
Attorney, Agent, or Firm—Charles L. Gholz

[57] ABSTRACT

Disclosed is apparatus for storing energy and generating electricity. The apparatus comprises (1) first means (10) for storing energy in the form of compressed gas and (2) second means (12) for generating electricity by allowing the gas compressed by the first means to expand, doing useful work.

40 Claims, 13 Drawing Figures

FIG. I

U.S. Patent  Feb. 3, 1981  Sheet 5 of 5  4,248,043
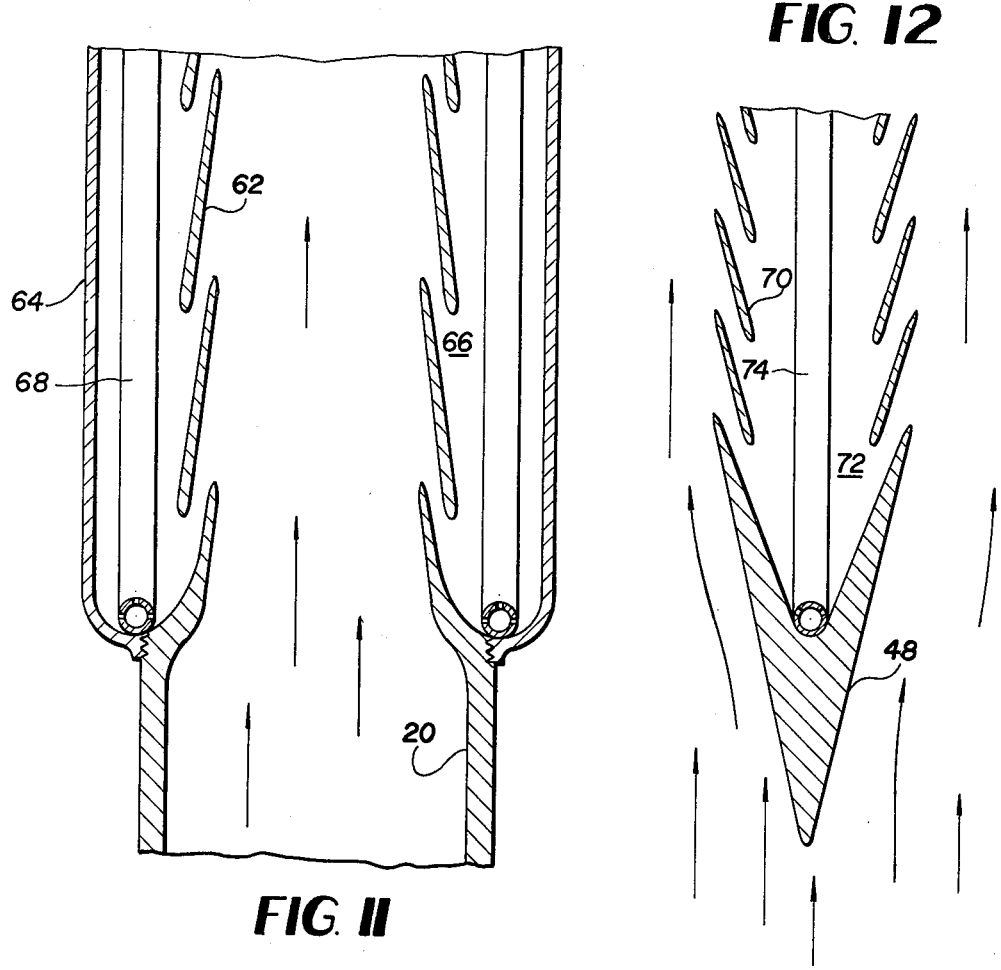
FIG. 12
FIG. 11
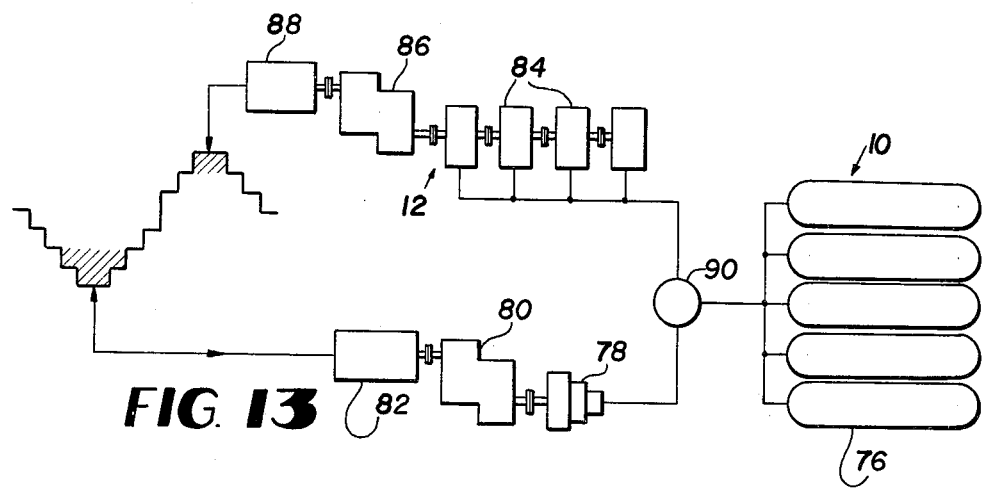
FIG. 13

APPARATUS FOR STORING ENERGY AND GENERATING ELECTRICITY

TECHNICAL FIELD

This invention relates to the generation of electricity. In particular, it relates to apparatus which stores energy during off hours and then converts the energy to electricity during hours of peak demand for electricity.

BACKGROUND OF PRIOR ART

As is well known, there is a difference of several hundred percent between the cost of commercial electricity during peak and off-peak hours. Several systems have already been designed to take advantage of this fact, perhaps the best known being one in which water is pumped up-hill to a storage facility (such as a mountain lake) during off-peak hours and then allowed to flow down-hill through a turbine during peak hours. Although this system is obviously tremendously inefficient in one sense, the cost of the electricity used to store the energy during off-peak hours (that is, to pump the water up-hill) is so much less than the selling price of the electricity during peak hours (when the stored energy is used to turn the turbine) that the system is commercially feasible.

Another prior-art method for generating electricity which is relevant to the presently preferred embodiment of the invention takes advantage of the difference in density between surface water and very deep water, the difference in density being due to their difference in temperature and pressure. Thus, systems have been designed in which dense cold water from far beneath the surface of a body of water is channeled upwardly through a vertical pipe of large diameter at the top of which a turbine wheel is turned by the rising water.

Another prior-art technique may be relevant to the presently preferred embodiment of the invention although it is not a method of generating electricity. Compressed air forced to an end of a pipe immersed beneath water and used to push water up the pipe has been used in connection with dredging operations and in connection with the recovery of doubloons along the Florida coasts. Although of no relevance to dredging or doubloon recovery operations, I have observed that, the deeper the submerged end of the pipe, the greater the velocity of the water exiting the top of the pipe.

Another prior art device consists of turbines or pistons in cylinder mechanisms or small comparable devices called "air motors." Such devices operate by using compressed air to cause a crank shaft to rotate, thereby providing the rotating power to operate winches where the use of other power causes hazards.

BRIEF SUMMARY OF THE INVENTION

The invention comprises apparatus for and a method of storing energy and generating electricity. The apparatus comprises (1) first means for storing electricity in the form of compressed gas and (2) second means for generating electricity by allowing the gas compressed by the first means to expand, doing useful work. In the presently preferred embodiment, the second means may be of two types. The first type comprises (1) a tube at least a first end of which is disposed in a body of liquid and the second end of which is maintained at a lower ambient pressure than the first end, (2) third means for introducing the liquid into the tube beneath the surface of the liquid, (3) fourth means for introducing the gas compressed by the first means into the tube beneath the surface of the liquid, and (4) at least one turbine disposed at the second end of the tube in operative contact with the liquid and gas flow therethrough. The second type comprises either a very large air motor or a plurality of air motors arranged in series on a shaft or on concentric shafts so as to combine their total shaft output as the input of a rotary electricity generating device.

BRIEF DESCRIPTION OF THE DRAWINGS

FIG. 11 is a schematic side sectional view of an element of a second presently preferred embodiment of the subject invention.

FIG. 12 is a schematic side sectional view of an element of a third presently preferred embodiment of the subject invention.

FIG. 13 is a schematic view of a land-based embodiment of the subject invention.

DETAILED DESCRIPTION OF THE PRESENTLY PREFERRED EMBODIMENTS

Figure 1:
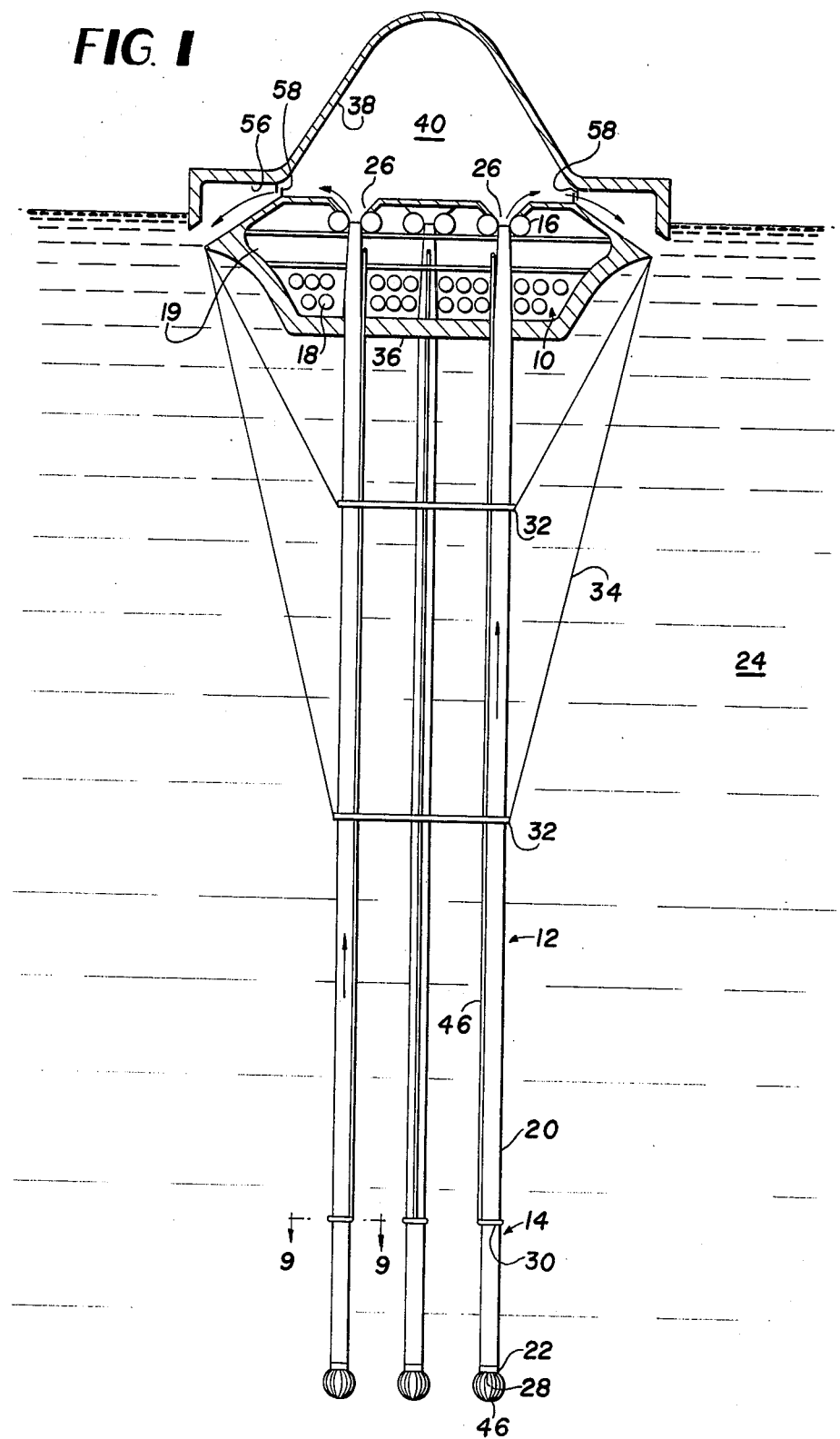
FIG. 1 is a schematic side view, partially in section, of a first presently preferred embodiment of the subject invention.

In its most generic aspect, the apparatus for storing energy and generating electricity described herein comprises means 10 for storing energy in the form of compressed gas (typically, though not necessarily, air) and means 12 for generating electricity by allowing the gas compressed by the means 10 to expand, doing useful work. In a somewhat less generic aspect, the means 12 comprises means 14 for causing the expanding gas to force a liquid (typically, though not necessarily, water) through a turbine 16.

In the presently preferred embodiment of the subject invention shown in FIGS. 1-10, the means 10 comprise a large cascade compressor system including large electric drive motors, controls, a tank storage field 18, and a reversible eutectic salt heat sink 19 to conserve the heat of the compressed gases. Since such systems are readily commercially available and since the specific type of compressor system used forms no part of the present invention, the means 10 are shown only very schematically in FIG. 1, and it will not be described further herein.

In the presently preferred embodiment of the subject invention, the means 12 comprise a tube 20 at least a first end 22 of which is disposed in a body of liquid 24 and the second end 26 of which is maintained at a lower ambient pressure than the end 22, means 28 for introducing the liquid into the tube 20 beneath the surface of the liquid 24, means 30 for introducing the gas compressed by the means 10 into the tube 20 beneath the surface of the liquid 24, and the previously mentioned turbine 16 disposed at the end 26 of the tube 20 in operative contact with the liquid and gas flowing through the tube 20. As will be readily understood, the compressed gas introduced into the tube 20 by the means 30 expands as it rises in the tube 20, forcing the liquid 24 through the turbine 16, generating electricity. The electricity is then conducted away from the module by any appropriate means, including, for instance, power cables (not shown) connected to the tubes 20 well below the surge level.

The tubes 20 are preferably of large diameter (e.g., one to ten meters) and great length (e.g., 1,000 meters). Stiffener grids 32 and guy wires 34 connecting the stiffener grids 32 to the platform 36 are preferably provided to stabilize the tubes 20, particularly if the apparatus is set up in a location subject to current action. At least the outer layer of the tubes 20, the stiffener grids 32, and other parts of the device in contact with the liquid 24, which of course is anticipated to be salt water, are preferably made from alloys which do not corrode in salt water and which inhibit or totally prevent marine growths on these parts.

Although not strictly necessary to the functioning of the device, means 38 are preferably provided for maintaining the end 26 of the tube 20 at subatmospheric pressure, thereby increasing the differential in ambient pressure between the two ends of the tubes 20. Conveniently the means 38 can comprise a bell-shaped shielding defining a plenum chamber 40 with the platform 36. The intakes for the means 10 are connected to the plenum chamber 40, so that a subatmospheric pressure is readily created in the plenum chamber 40 during use of the means 10.

Means 42 are provided to prevent the entry of solids (e.g., fish) carried by the fluid into the tube 20. As shown, the means 42 preferably comprise cyclone type rotating screens.

The means 30 preferably comprise at least one annular pressure chamber 44 (best seen in FIG. 9) disposed about the tube 20 beneath the surface of the liquid 24 and having a plurality of outlets 46 in fluid communication with the inside of the tube 20. A path of fluid communication 46 connecting the means 10 to the annular pressure chamber 44 is provided, preferably in the form of a pipe attached to the outer surface of the tube 20. Preferably a plurality of the annular pressure chambers 44 are provided at spaced intervals (e.g., 100 meters), and means are provided for controlling the flow of compressed gas through the outlets 46 of at least one of the plurality of annular pressure chambers. In this way, if the compressed air supply is depleted to the point where sufficient pressure to supply the lowest (and most efficient) annular pressure chamber 44 is temporarily unavailable, the next lowest pressure chamber is brought "on line," and so on for as many pressure chambers as are provided.

Figure 3:
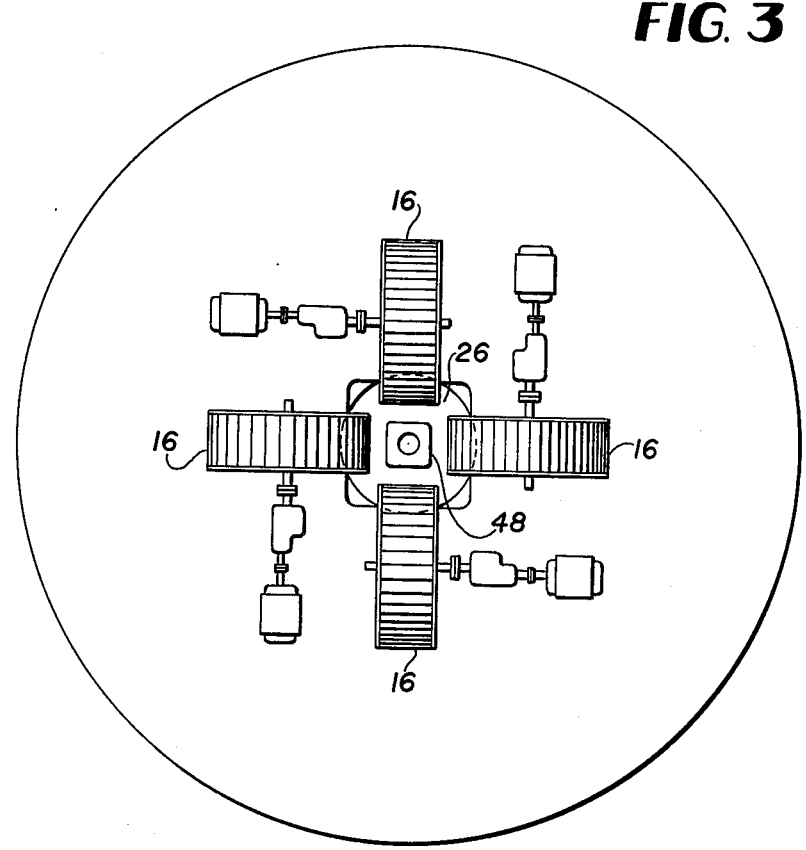
FIG. 3 is a plan view of one unit of the embodiment shown in FIG. 1.
Figure 5:
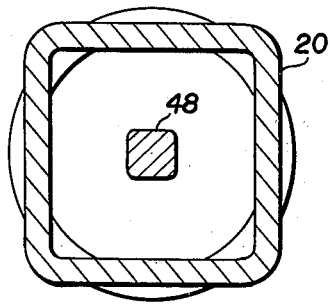
FIG. 5 is a view along the line 5—5 in FIG. 4.
Figure 6:
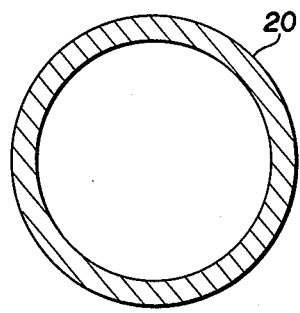
FIG. 6 is a view along the line 6—6 in FIG. 4.
Figure 7:
FIG. 7 is a view along the line 7—7 in FIG. 4.
Figure 8:
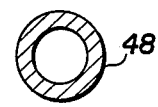
FIG. 8 is a view along the line 8—8 in FIG. 4.

As best seen in FIG. 3, a plurality of turbines 16 are preferably disposed symmetrically about the end 26 of each tube 20. To facilitate this arrangement, the inside of the tube 20 is preferably round in cross-section at its lower end 22 (as shown in FIG. 6), but gradually becomes polygonal in cross-section prior to its upper end 26 (as shown in FIG. 5). A flow-separator 48 (best seen in FIG. 4) is preferably coaxially disposed within the tube 20 at its end 26, extending from that end beyond the turbines 16 towards the end 22. The flow-separator 48 is faired so as to increase the velocity of the liquid and the compressed gas as it passes the turbine 16. Means 50 are provided to move the flow-separator 48 axially in and out of the tube 20 through its end 26. Conveniently, the flow-separator 48 can be of solid cross-section at its working end (as shown in FIG. 7) and of hollow cross-section at its upper end (as shown in FIG. 8) to facilitate this movement with the aid of an appropriately mounted hydraulic cylinder (not shown).

Figure 4:
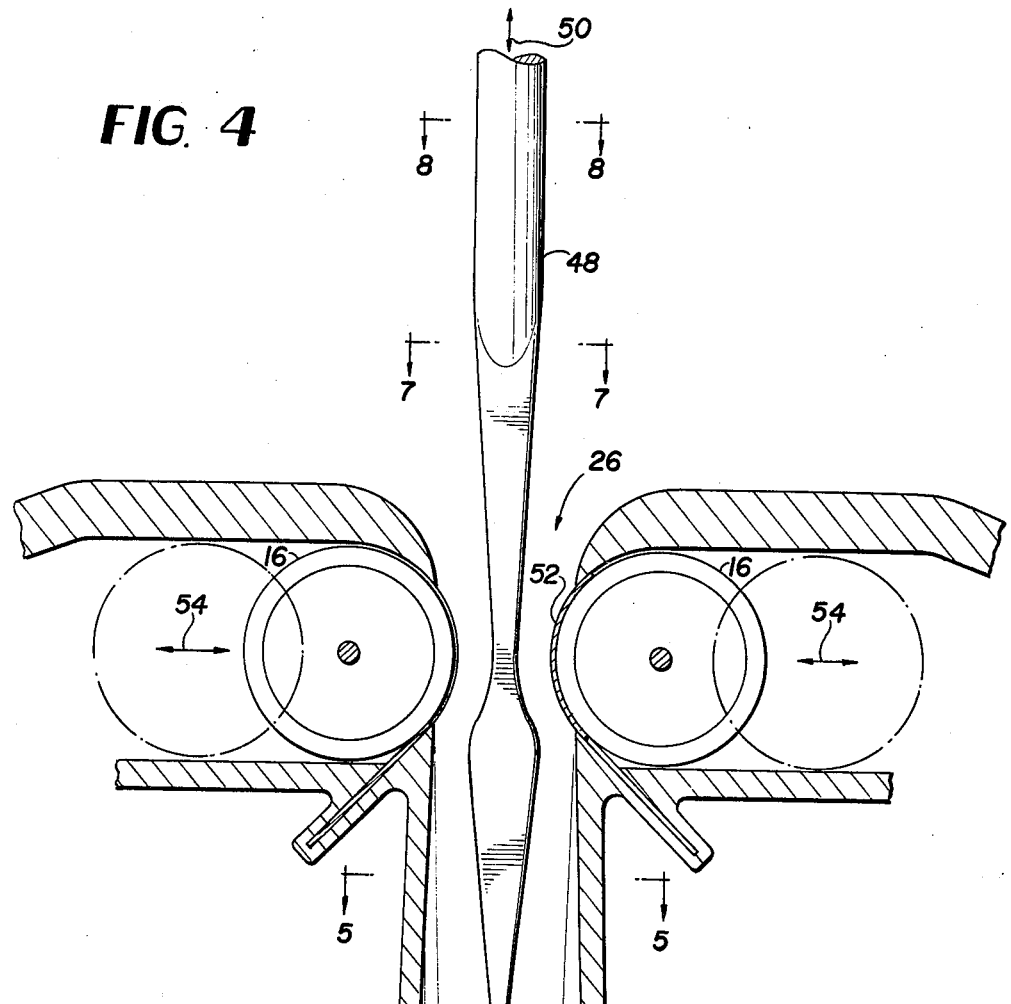
FIG. 4 is a schematic side view, partially in section, of one unit of the embodiment shown in FIG. 1.
Figure 9:
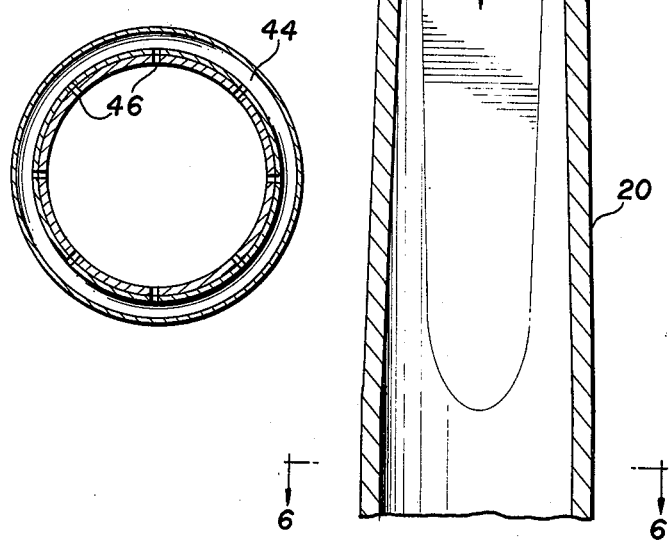
FIG. 9 is a view along the line 9—9 in FIG. 1.

As shown in FIG. 4, means 52 for selectively shielding the turbines 16 from the flow of liquid and gas in the tube 20 and means 54 for moving the turbines 16 back and forth between a first location in which they are in position to operatively engage the flow of liquid and gas in the tube 20 and a second location in which they are in position for maintenance are preferably provided. The means 54 can, for instance, comprise a baseplate for both the turbine 16 and its generator which can be slid horizontally relative to the tube 20.

Figure 10:
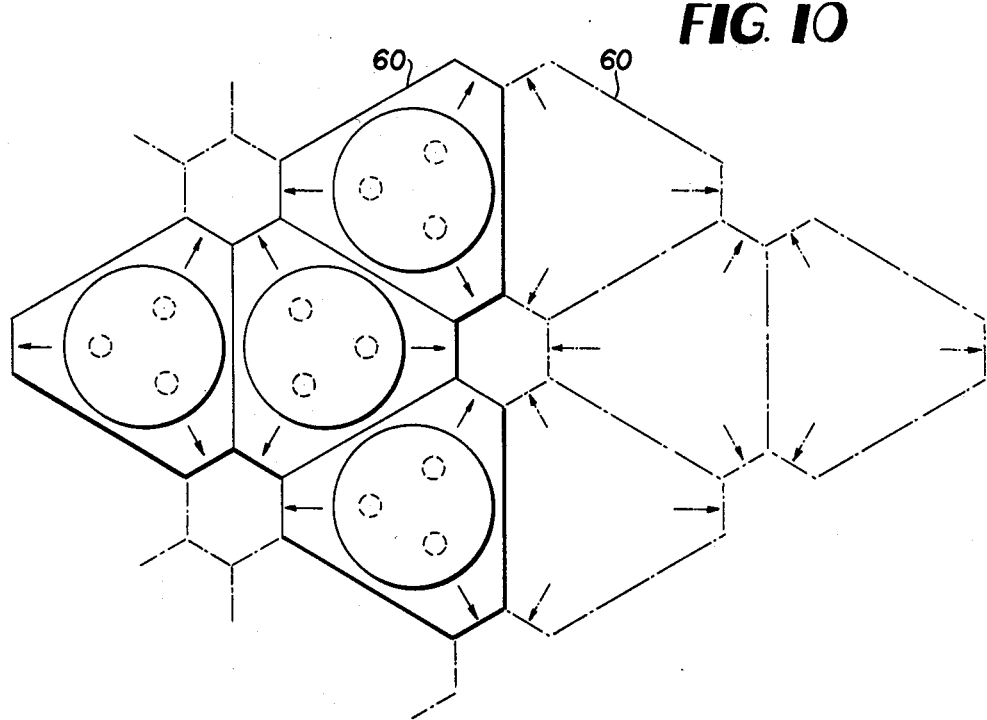
FIG. 10 is a schematic plan view of a plurality of the embodiment shown in FIG. 1 connected together into an array.

Turning back to FIG. 1, it will be seen that means 56 for directing the flow of the liquid from the ends 26 of the tubes 20 back into the body of liquid 24. Preferably means 58 for selectively varying the extent of the flow of the liquid from the ends 26 of the tubes 20 in each of a plurality of directions are provided to enable the position of the apparatus in the body of liquid to be at least partially controlled. As best seen in FIG. 10, liquid preferably exits each module in at least three directions, permitting rather precise positioning of the module by this method. Moreover, the means 58 are used to prevent rotation of the module, which might injure the power lead-off cable (not shown).

Figure 2:
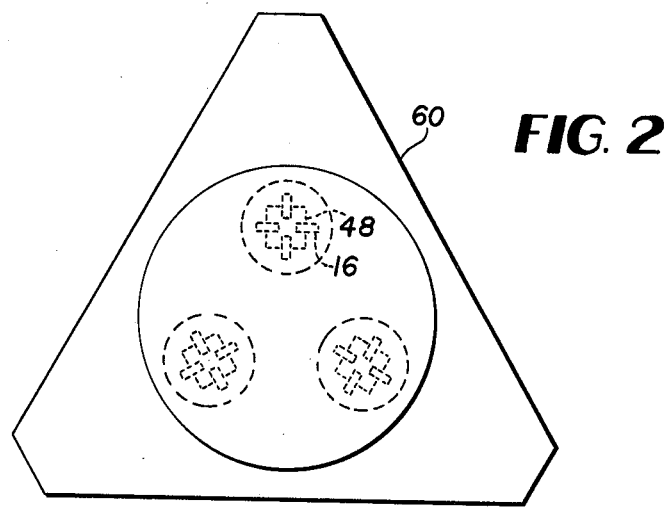
FIG. 2 is a schematic plan view of the embodiment shown in FIG. 1.

As best seen in FIGS. 1 and 2, a plurality of the individual units are preferably symmetrically disposed in a module 60, and, as best seen in FIG. 10, a plurality of the module 60 can be symmetrically arranged with respect to one another and connected to each other, resulting in the indefinite expandability of the power-generation capacity of the overall system.

It is a particular feature of this invention that the means 30 are adapted to cause the gas compressed by the means 10 to enter the tubes 20 in the form of large bubbles which extend from one side to the other of the tubes 20. These large bubbles cause the liquid within the tubes 20 to rise rapidly due to the much greater pressure at the deep end of tubes than at the surface end. It should be particularly noted that this mode of operation differs from the practice of applying a continuous flow of relatively small compressed air bubbles to a stream of water (as is done in dredging) to obtain a relatively homogeneous mixture of water and air bubbles. In the particularly preferred embodiment of this invention, the squirts of gas are intermittent but of great volume, so as to form bubbles filling the tube cross-section but leaving segments, or "plugs," of rising liquid between the bubbles to impact on the turbine blades. (Of course, as will be readily appreciated, the turbines must be solidly constructed and mounted to accept such heterogeneous flow.)

Modified forms of some of the structure of the first embodiment are shown in FIGS. 11 and 12. These modifications may be used separately or together to reduce the heterogeneity of the flow past the turbines.

In the FIG. 11 modification, louvres 62 are provided in the walls of the tube 20 just beneath the turbines, and an outer shell 64 is provided around the louvers 62, defining a plenum 66. A vacuum may be applied to the plenum 66 via one or more conduits 68 in order to extract air bubbles from the tube 20 through the spaces between the luovres 62, while the water is carried past the louvres 62 due to its higher viscosity and momentum.

The FIG. 12 modification is similar in principal to the FIG. 11 modification. In this modification, louvres 70 are provided beneath the turbines in the flow-separator 48, the hollow center of which serves as a plenum 72. When a vacuum is applied to the plenum 72 via conduit 74, the air bubbles are extracted from the tube 20 through the spaces between the louvres 70, while the water is carried past the louvres 68 due to its higher viscosity and momentum.

FIG. 13 shows in very schematic form a land-based embodiment of the subject invention. In this embodiment, the means 10 for storing energy in the form of compressed gas comprises a high pressure air storage tank system 76, a compressor 78, a reduction gear 80, and a motor 82. The means 12 for generating electricity comprises a plurality of large air motors 84 arranged in series, a reduction gear 86, and a generator 88. The means 10 and 12 are interconnected by a three-way valve 90, and they are utilized in the manner suggested by the graph at the left in FIG. 13. That graph represents the daily rate of charges for electricity by a typical utility. When the rate is low (during off-peak hours), electricity is provided by conventional means to power the motor 82, which drives the compressor 78 via the reduction gear 80. The compressor 78 produces high pressure air, which passes through the three-way valve 90 to the high pressure air storage tank system 76. When the rate of charge for electricity is high (during peak hours), the compressed air is discharged through the three-way valve 90 to power the air motors 84, which drive the generator 88 via the reduction gear 86. The generator 88 produces electricity which is fed back into the electrical system. Of course, as will be immediately apparent to those of ordinary skill in the art, the functions of the motor 82 and the generator 88 could be combined in one unit used as a motor to compress gas (air) during off-peak hours and as a generator to produce electricity during peak hours.

Caveat

While the present invention has been illustrated by a detailed description of several preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

I claim:

1. Apparatus for storing energy and generating electricity, said apparatus comprising:
   (a) first means for storing energy in the form of compressed gas and
   (b) second means for generating electricity by allowing the gas compressed by said first means to expand, doing useful work, said second means comprising:
      (i) a tube at least a first end of which is disposed in a body of liquid and the second end of which is maintained at a lower ambient pressure than the first end;
      (ii) third means for introducing the liquid into said tube beneath the surface of the liquid;
      (iii) fourth means for introducing the gas compressed by said first means into said tube beneath the surface of the liquid;
      (iv) at least one turbine disposed at the second end of said tube in operative contact with the liquid and gas flowing therethrough; and
      (v) fifth means for maintaining the second end of said tube at subatmospheric pressure,
   whereby the expanding gas forces the liquid through said turbine, generating electricity.

2. Apparatus as recited in claim 1 and further comprising sixth means for preventing the entry of solids carried by the fluid into said tube.

3. Apparatus as recited in claim 1 wherein said fourth means comprises:
   (a) at least one annular pressure chamber
      (i) disposed about said tube beneath the surface of said liquid and
      (ii) having a plurality of outlets in fluid communication with the inside of said tube and
   (b) a path of fluid communication connecting said first means to said annular pressure chamber.

4. Apparatus as recited in claim 1 comprising a plurality of said turbines symmetrically disposed about said tube.

5. Apparatus as recited in claim 1 comprising a plurality of said tubes symmetrically disposed in a module.

6. Apparatus as recited in claim 5 comprising a plurality of said modules connected to each other and symmetrically arranged with respect to one another.

7. Apparatus as recited in claim 1 wherein said fourth means causes the gas compressed by said first means to enter said tube in the form of large bubbles which extend from one side to the other of said tube.

8. Apparatus for storing energy and generating electricity, said apparatus comprising:
   (a) first means for storing energy in the form of compressed gas and
   (b) second means for generating electricity by allowing the gas compressed by said first means to expand, doing useful work, said second means comprising:
      (i) a tube at least a first end of which is disposed in a body of liquid and the second end of which is maintained at a lower ambient pressure than the first end;
      (ii) third means for introducing the liquid into said tube beneath the surface of the liquid;
      (iii) fourth means for introducing the gas compressed by said first means into said tube beneath the surface of the liquid;
      (iv) at least one turbine disposed at the second end of said tube in operative contact with the liquid and gas flowing therethrough; and
      (v) seventh means for directing the flow of the liquid from the second end of said tube back into the body of the liquid in a manner which at least partially controls the position of the apparatus in the body of liquid.

9. Apparatus as recited in claim 8, and further comprising eighth means for selectively varying the extent of the flow of the liquid from the second end of said tube in each of a plurality of directions.

10. Apparatus as recited in claim 8 and further comprising sixth means for preventing the entry of solids carried by the fluid into said tube.

11. Apparatus as recited in claim 8 wherein said fourth means comprises:

(a) at least one annular pressure chamber
  (i) disposed about said tube beneath the surface of said liquid and
  (ii) having a plurality of outlets in fluid communication with the inside of said tube and
(b) a path of fluid communication connecting said first means to said annular pressure chamber.

12. Apparatus as recited in claim 8 comprising a plurality of said turbines symmetrically disposed about said tube.

13. Apparatus as recited in claim 8 comprising a plurality of said tubes symmetrically disposed in a module.

14. Apparatus as recited in claim 13 comprising a plurality of said modules connected to each other and symmetrically arranged with respect to one another.

15. Apparatus as recited in claim 8 wherein said fourth means causes the gas compressed by said first means to enter said tube in the form of large bubbles which extend from one side to the other of said tube.

16. Apparatus for storing energy and generating electricity, said apparatus comprising:
(a) first means for storing energy in the form of compressed gas and
(b) second means for generating electricity by allowing the gas compressed by said first means to expand, doing useful work, said second means comprising:
  (i) a tube at least a first end of which is disposed in a body of liquid and the second end of which is maintained at a lower ambient pressure than the first end;
  (ii) third means for introducing the liquid into said tube beneath the surface of the liquid;
  (iii) fourth means for introducing the gas compressed by said first means into said tube beneath the surface of the liquid;
  (iv) at least one turbine disposed at the second end of said tube in operative contact with the liquid and gas flowing therethrough; and
  (v) ninth means for moving said turbine back and forth between a first location in which it is in position to operatively engage the flow of liquid and gas in said tube and a second location in which it is in position for maintenance; and
  (vi) tenth means for selectively shielding said turbine from the flow of liquid and gas in said tube, whereby the expanding gas forces the liquid through said turbine, generating electricity.

17. Apparatus as recited in claim 16 and further comprising sixth means for preventing the entry of solids carried by the fluid into said tube.

18. Apparatus as recited in claim 16 wherein said fourth means comprises:
(a) at least one annular pressure chamber
  (i) disposed about said tube beneath the surface of said liquid and
  (ii) having a plurality of outlets in fluid communication with the inside of said tube and
(b) a path of fluid communication connecting said first means to said annular pressure chamber.

19. Apparatus as recited in claim 16 comprising a plurality of said turbines symmetrically disposed about said tube.

20. Apparatus as recited in claim 16 comprising a plurality of said tubes symmetrically disposed in a module.

21. Apparatus as recited in claim 20 comprising a plurality of said modules connected to each other and symmetrically arranged with respect to one another.

22. Apparatus as recited in claim 16 wherein said fourth means causes the gas compressed by said first means to enter said tube in the form of large bubbles which extend from one side to the other of said tube.

23. Apparatus for storing energy and generating electricity, said apparatus comprising:
(a) first means for storing energy in the form of compressed gas and
(b) second means for generating electricity by allowing the gas compressed by said first means to expand, doing useful work, said second means comprising:
  (i) a tube at least a first end of which is disposed in a body of liquid and the second end of which is maintained at a lower ambient pressure than the first end, the inside of said tubing being round in cross-section at its first end but gradually becoming polygonal in cross-section prior to its second end;
  (ii) third means for introducing the liquid into said tube beneath the surface of the liquid;
  (iii) fourth means for introducing the gas compressed by said first means into said tube beneath the surface of the liquid; and
  (iv) at least one turbine disposed at the second end of said tube in operative contact with the liquid and gas flowing therethrough,
whereby the expanding gas forces the liquid through said turbine generating electricity.

24. Apparatus as recited in claim 23 and further comprising sixth means for preventing the entry of solids carried by the fluid into said tube.

25. Apparatus as recited in claim 23 wherein said fourth means comprises:
(a) at least one annular pressure chamber
  (i) disposed about said tube beneath the surface of said liquid and
  (ii) having a plurality of outlets in fluid communication
(b) a path of fluid communication connecting said first means to said annular pressure chamber.

26. Apparatus as recited in claim 23 comprising a plurality of said turbines symmetrically disposed about said tube.

27. Apparatus as recited in claim 23 comprising a plurality of said tubes symmetrically disposed in a module.

28. Apparatus as recited in claim 27 comprising a plurality of said modules connected to each other and symmetrically arranged with respect to one another.

29. Apparatus as recited in claim 23 wherein said fourth means causes the gas compressed by said first means to enter said tube in the form of large bubbles which extend from one side to the other of said tube.

30. Apparatus for storing energy and generating electricity, said apparatus comprising:
(a) first means for storing energy in the form of compressed gas and
(b) second means for generating electricity by allowing the gas compressed by said first means to expand, doing useful work, said second means comprising:
  (i) a tube at least a first end of which is disposed in a body of liquid and the second end of which is maintained at a lower ambient pressure than the first end;

(ii) third means for introducing the liquid into said tube beneath the surface of the liquid;

(iii) fourth means for introducing the gas compressed by said first means into said tube beneath the surface of the liquid;

(iv) at least one turbine disposed at the second end of said tube in operative contact with the liquid and gas flowing therethrough;

(v) a flow-separator coaxially disposed within said tube at the second end thereof and extending beyond said turbine toward the first end thereof, whereby the expanding gas forces the liquid through said turbine generating electricity.

31. Apparatus as recited in claim 30 and further comprising eleventh means for moving said flow-separator axially in and out of said tube through its second end.

32. Apparatus as recited in claim 30 wherein said flow-separator is faired so as to increase the velocity of the liquid and the compressed gas as it passes said turbine.

33. Apparatus as recited in claim 30 wherein:

(a) louvres are provided in the walls of said tube just beneath said turbine and (b) an outer shell is provided around the louvres, defining a plenum, whereby, when a vacuum is applied to the plenum, gas is extracted from said tube through the spaces between said louvres, while the liquid is carried past said louvres due to its higher viscosity and momentum.

34. Apparatus as recited in claim 30 wherein:

(a) louvres are provided in said flow-separator beneath said turbine and (b) said flow-separator is hollow, serving as a plenum, whereby, when a vacuum is applied to the plenum, gas is extracted from said tube through the spaces between said louvres, while the liquid is carried past said louvres due to its higher viscosity and momentum.

35. Apparatus as recited in claim 30 and further comprising sixth means for preventing the entry of solids carried by the fluid into said tube.

36. Apparatus as recited in claim 30 wherein said fourth means comprises:

(a) at least one annular pressure chamber
 (i) disposed about said tube beneath the surface of said liquid and
 (ii) having a plurality of outlets in fluid communication with the inside of said tube and (b) a path of fluid communication connecting said first means to said annular pressure chamber.

37. Apparatus as recited in claim 30 comprising a plurality of said turbines symmetrically disposed about said tube.

38. Apparatus as recited in claim 30 comprising a plurality of said tubes symmetrically disposed in a module.

39. Apparatus as recited in claim 38 comprising a plurality of said modules connected to each other and symmetrically arranged with respect to one another.

40. Apparatus as recited in claim 30 wherein said fourth means causes the gas compressed by said first means to enter said tube in the form of large bubbles which extend from one side to the other of said tube.

* * * * *